(12) United States Patent
Voyer

(10) Patent No.: US 8,292,345 B2
(45) Date of Patent: Oct. 23, 2012

(54) VEHICLES WITH REAR HATCH ASSEMBLIES

(75) Inventor: Craig Paul Voyer, Jackson, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 312 days.

(21) Appl. No.: 12/483,269

(22) Filed: Jun. 12, 2009

(65) Prior Publication Data

US 2010/0314903 A1    Dec. 16, 2010

(51) Int. Cl.
    B62D 27/06    (2006.01)
(52) U.S. Cl. ............... 296/26.08; 296/106; 296/146.8
(58) Field of Classification Search ............... 296/146.1, 296/146.2, 146.3, 146.8, 55, 57.1, 106, 26.08, 296/26.09; 49/340; 701/49
    See application file for complete search history.

(56) References Cited

U.S. PATENT DOCUMENTS

| | | | |
|---|---|---|---|
| 3,749,440 A * | 7/1973 | Lathers | 296/51 |
| 4,076,301 A * | 2/1978 | Gergoe | 296/50 |
| 4,630,858 A * | 12/1986 | Bez | 296/146.8 |
| 5,685,594 A | 11/1997 | Harper | |
| 6,059,340 A * | 5/2000 | Thompson et al. | 296/26.04 |
| 6,131,989 A | 10/2000 | Montone et al. | |
| 6,220,649 B1 * | 4/2001 | Rife | 296/146.12 |
| 6,367,864 B2 * | 4/2002 | Rogers et al. | 296/146.4 |
| 6,454,341 B2 * | 9/2002 | Tolinski | 296/106 |
| 6,471,279 B2 | 10/2002 | Pommeret | |
| 6,471,284 B2 * | 10/2002 | Landmesser | 296/146.8 |
| 6,485,156 B1 * | 11/2002 | Marshall | 359/879 |
| 6,505,882 B1 * | 1/2003 | Morbach et al. | 296/146.11 |
| 6,637,796 B1 * | 10/2003 | Westerdale et al. | 296/57.1 |
| RE38,400 E * | 1/2004 | Kowall et al. | 318/283 |
| 6,805,393 B1 | 10/2004 | Stevenson et al. | |
| 6,874,839 B2 | 4/2005 | Acker et al. | |
| 7,165,800 B2 | 1/2007 | Thiele et al. | |
| 7,168,753 B1 * | 1/2007 | Faubert et al. | 296/146.12 |
| 7,393,043 B2 * | 7/2008 | Kargilis et al. | 296/146.4 |
| 7,439,460 B1 * | 10/2008 | Watson | 200/5 R |
| 7,794,007 B2 * | 9/2010 | Konet et al. | 296/146.16 |
| 2003/0122396 A1 | 7/2003 | Humphrey et al. | |
| 2005/0100174 A1 * | 5/2005 | Howard et al. | 381/86 |
| 2006/0160401 A1 * | 7/2006 | Schroer | 439/397 |
| 2006/0236970 A1 * | 10/2006 | Inada et al. | 123/179.4 |
| 2007/0046060 A1 * | 3/2007 | Werner | 296/51 |
| 2007/0096502 A1 | 5/2007 | Hakamata et al. | |
| 2008/0103660 A1 * | 5/2008 | Browne et al. | 701/46 |
| 2008/0238122 A1 | 10/2008 | Leopold et al. | |

* cited by examiner

*Primary Examiner* — Glenn Dayoan
*Assistant Examiner* — Pinel Romain
(74) *Attorney, Agent, or Firm* — Dinsmore & Shohl LLP (57) ABSTRACT

A rear hatch assembly of a vehicle includes a hatch frame pivotally connected to a vehicle body at a first pivot axis such that the hatch frame is capable of movement relative to the vehicle body about the first pivot axis. A tailgate is pivotally connected to the hatch frame at a second pivot axis such that the tailgate is capable of movement relative to the hatch frame about the second pivot axis.

20 Claims, 8 Drawing Sheets

VEHICLES WITH REAR HATCH ASSEMBLIES

TECHNICAL FIELD

The present specification generally relates to vehicles with rear closures and, more specifically, to vehicles including rear hatch assemblies.

BACKGROUND

Rear closures for vehicles such as sport utility vehicles, vans, etc. vary among vehicles. One such rear closure is a hatch that pivots upwardly at an upper edge of the hatch from a closed position to an open position. These hatches may be commonly seen on sport utility vehicles or hatch back cars. Other rear closures include doors that swing on a vertical axis or a tailgate seen on many trucks. Some rear closures include a window and door where the window can pivot separately of the door. While there are a number of rear closure types, there continues to be a need for other rear closures, for example, to add or maximize cargo space and/or for ease of use.

SUMMARY

In one embodiment, a rear hatch assembly of a vehicle includes a hatch frame pivotally connected to a vehicle body at a first pivot axis such that the hatch frame is capable of movement relative to the vehicle body about the first pivot axis. A tailgate is pivotally connected to the hatch frame at a second pivot axis such that the tailgate is capable of movement relative to the hatch frame about the second pivot axis.

In another embodiment, a hatch assembly for a vehicle includes a hatch frame and a tailgate carried by the hatch frame. The tailgate is moveable relative to the hatch frame. A window is configured to retract into the tailgate.

In another embodiment, a vehicle includes a vehicle body and a hatch frame connected to the vehicle body. The hatch frame is moveable relative to the vehicle body. A window is connected to the hatch frame. The window is moveable relative to the vehicle body and the hatch frame.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
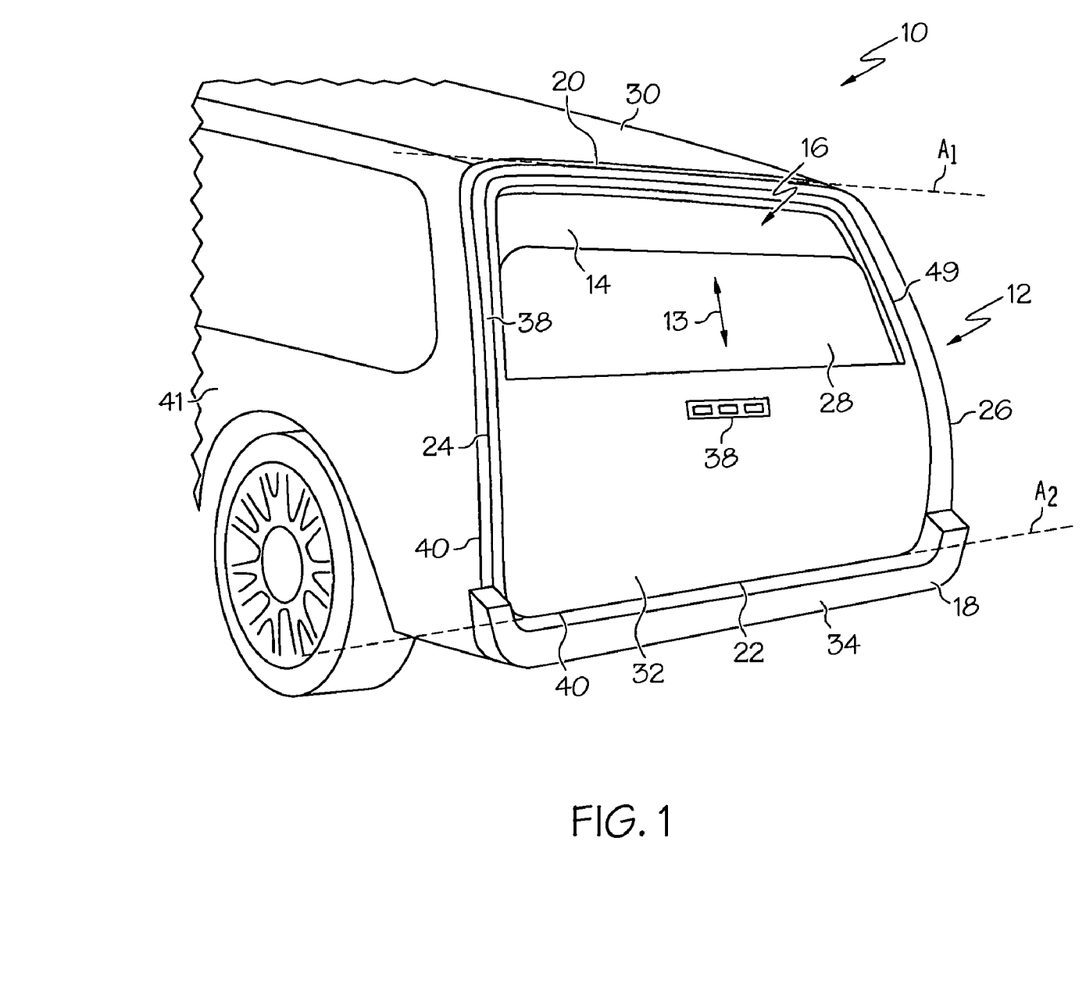
FIG. 1 is a perspective rear view of a vehicle with an embodiment of a rear hatch assembly.
Figure 2:
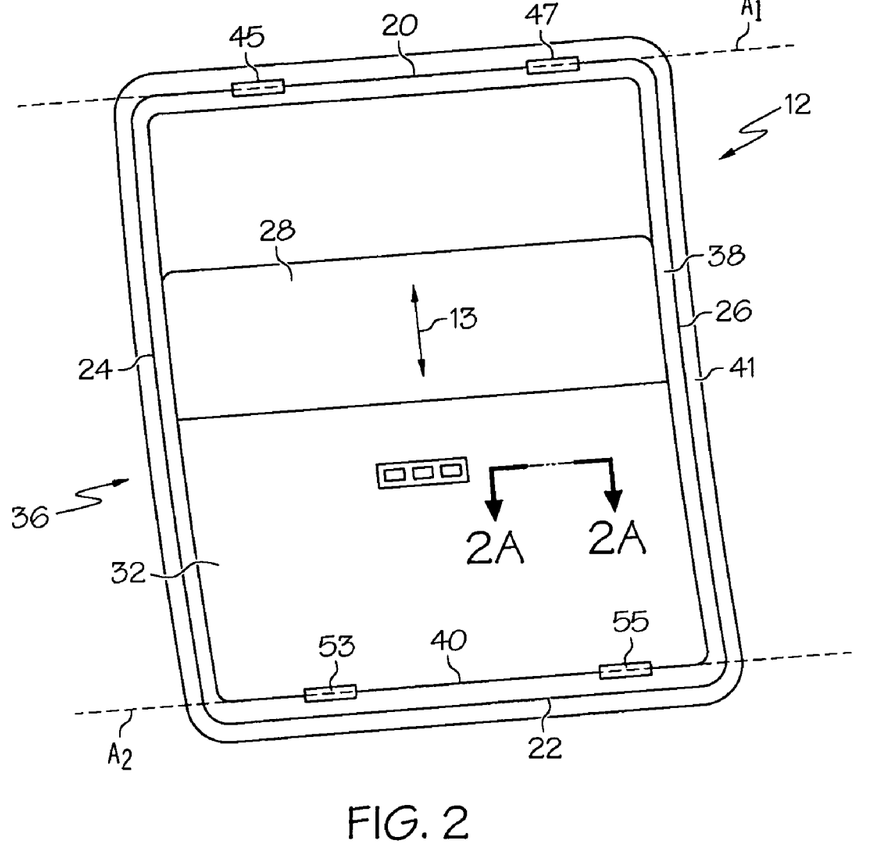
FIG. 2 is a diagrammatic rear view of the rear hatch assembly of FIG. 1.
Figure 3:
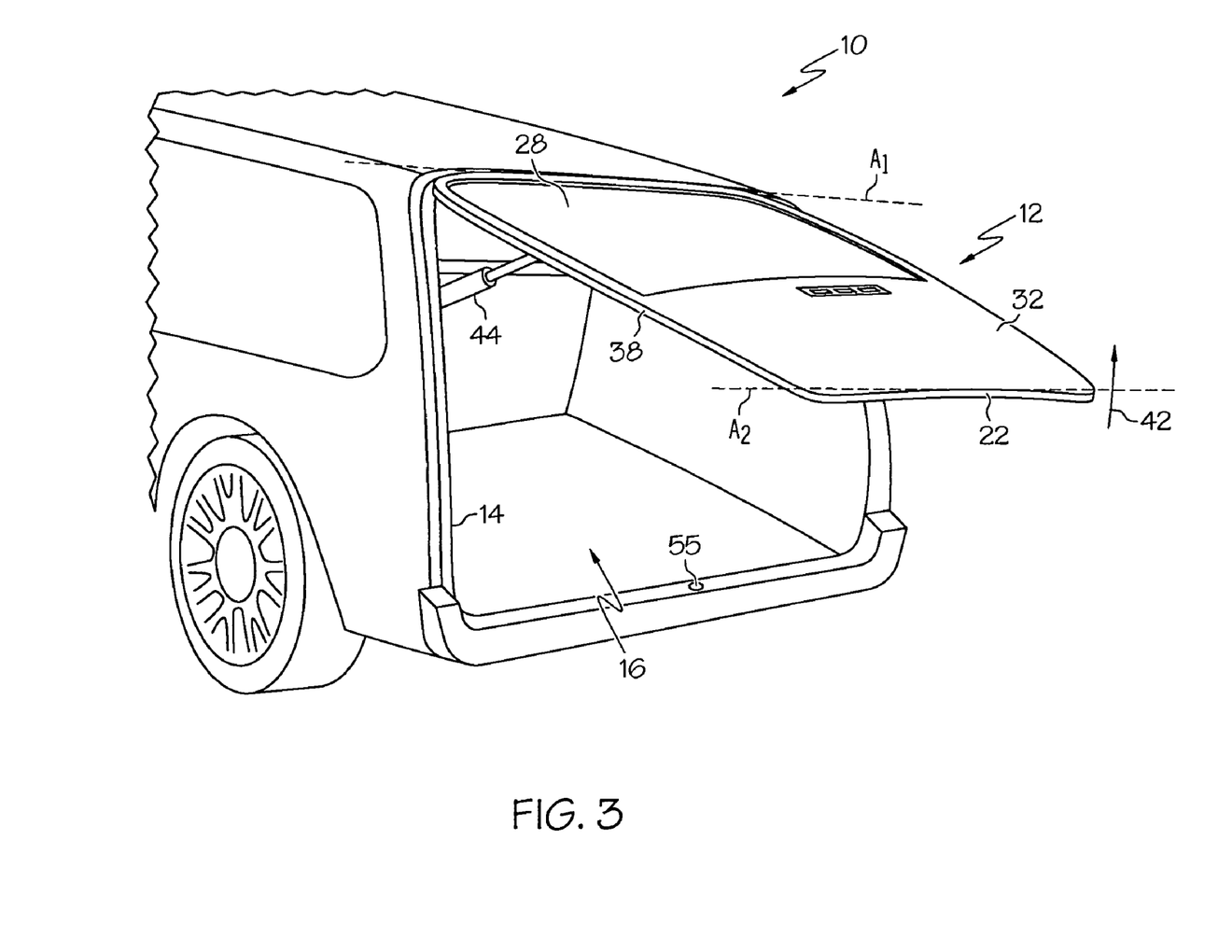
FIG. 3 is a perspective rear view of the vehicle of FIG. 1 and rear hatch assembly in a first open configuration.
Figure 4:
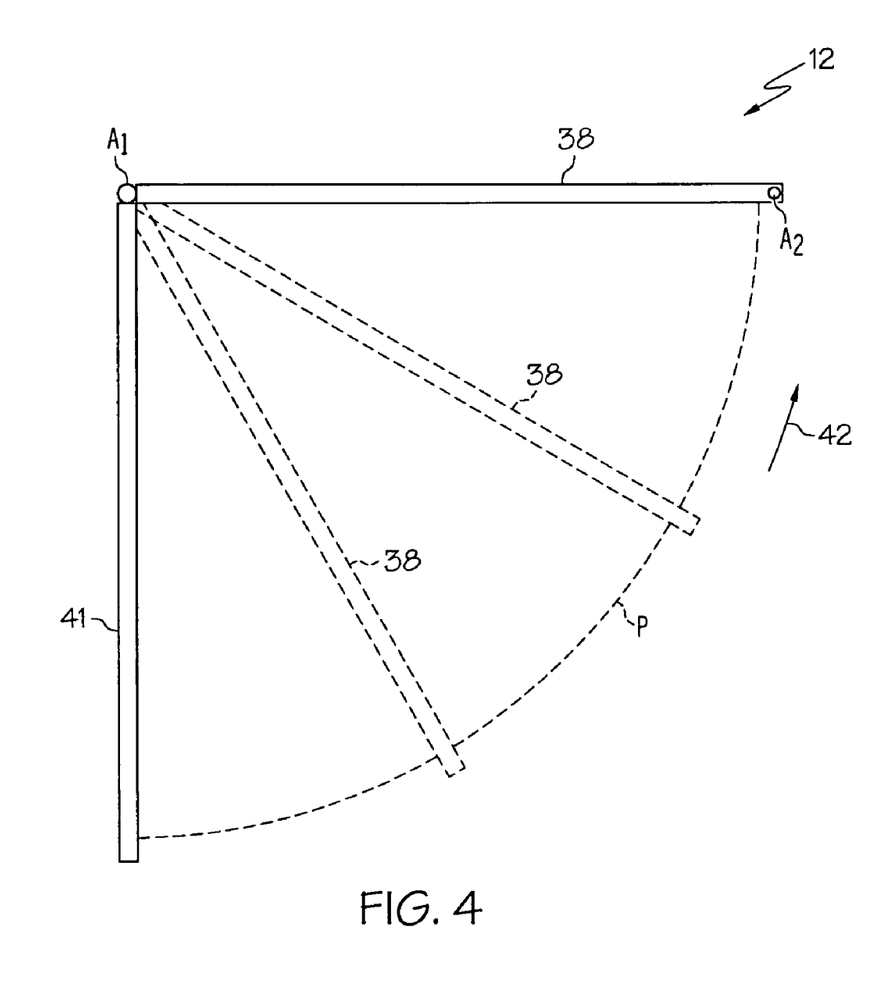
FIG. 4 is a diagrammatic side view of the rear hatch assembly of FIG. 3 in the first open configuration.
Figure 5:
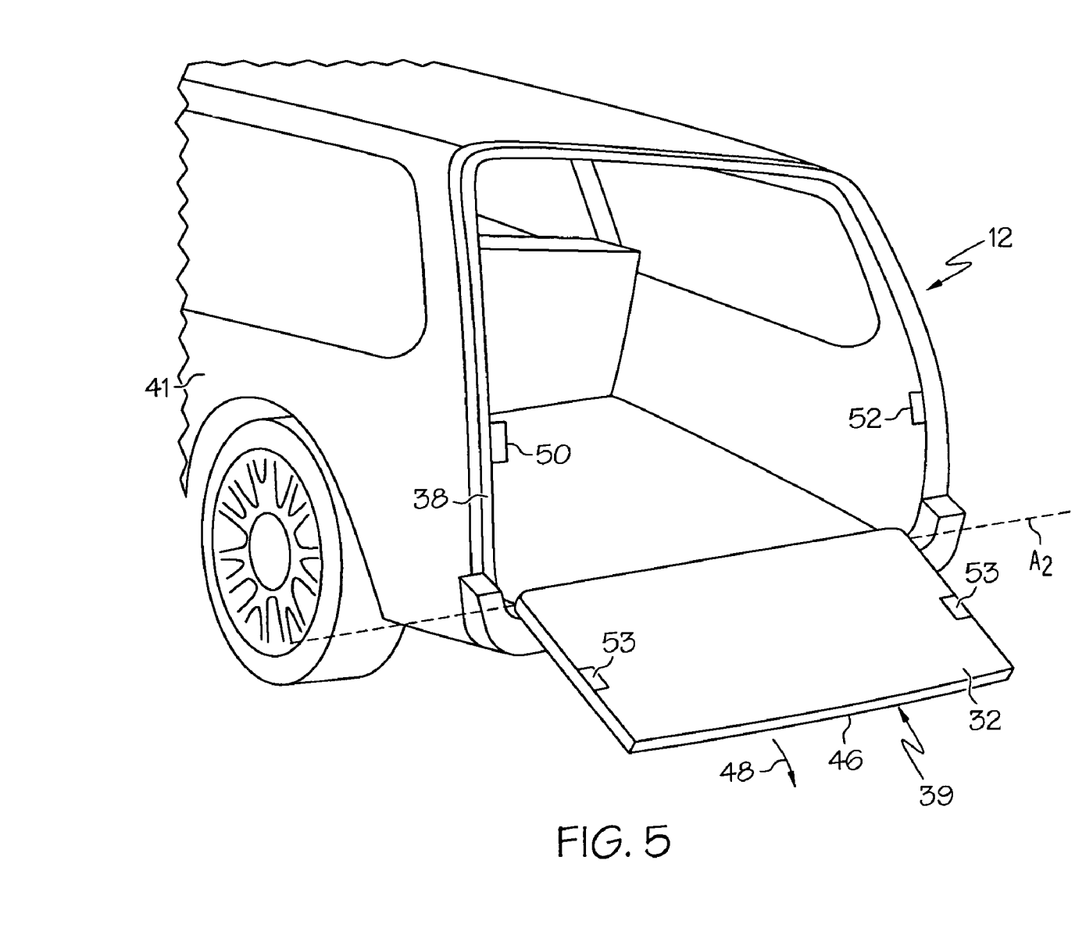
FIG. 5 is a perspective rear view of the vehicle of FIG. 1 and rear hatch assembly in a second open configuration.

FIGS. 1-6 generally depict one embodiment of a vehicle 10 including a rear hatch assembly 12 having multiple configurations, which may be used to increase cargo capacity and add utility. For example, FIGS. 1 and 2 illustrate the vehicle 10 where a rear window 28 is being retracted in the direction of arrow 13 into a tailgate 32 providing a first open configuration for the rear hatch assembly 12. FIG. 3 illustrates the vehicle 10 in another configuration where an entire rear hatch assembly 12 including the rear window 28 and the tailgate 32 is rotated upwardly providing a second open configuration for the rear hatch assembly 12. FIG. 5 illustrates the vehicle 10 with the tailgate 32 rotated downwardly with the rear window 28 retracted into the tailgate 32 providing a third open configuration for the rear hatch assembly 12. As used herein, the terms "front" and "rear" indicate the front and rear of the vehicle 10, and terms "upper" and "lower" denote upper and lower in the vertical direction. The vehicle 10 may be any suitable vehicle type such as the illustrated sport utility vehicle, a van, a hatch back, station wagon, etc. Various embodiments of the rear hatch assembly 12 and the operation of the rear hatch assembly will be described in more detail herein.

Referring to FIG. 1, the vehicle 10 includes a vehicle body 41 and the rear hatch assembly 12 that moves relative to the vehicle body 41 to allow or inhibit access to a cargo opening 14 leading to a cargo area 16 at a rear 18 of the vehicle 10. Referring also to FIG. 2, the rear hatch assembly 12 includes the rear window 28, the tailgate 32 and a hatch frame 38. The rear window 28 is provided at an upper portion of the rear hatch assembly 12 (e.g., near a roof 30 of the vehicle 10) and may be slidable relative to the tailgate 32 and hatch frame 38 (see arrow 13) between fully extended and fully retracted positions using any suitable linkage such as an electric motor attached to various gears that provide sufficient torque to lift and lower the rear window. The rear window 28 may be formed of a pane of glass or other suitable material such as a transparent plastic. While the rear window 28 is illustrated as being somewhat planar, it may have a different contour such as one that that curves out of the plane.

Figure 2A:
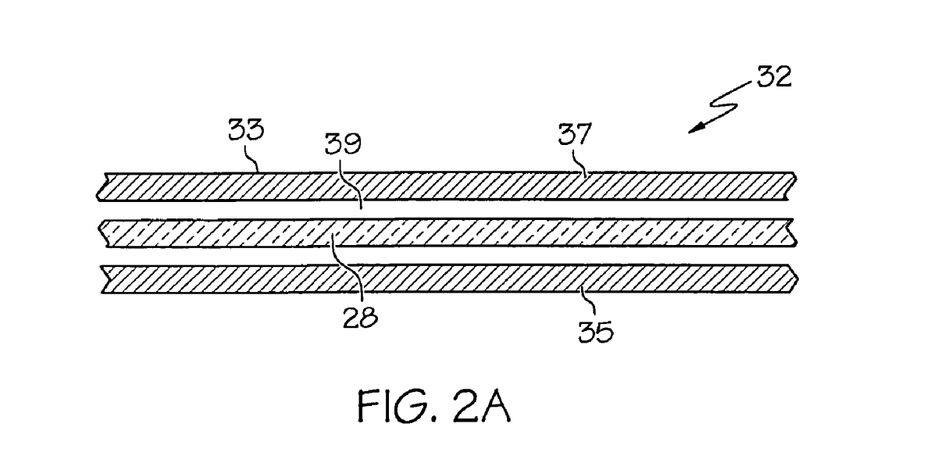

The tailgate 32 is provided at a lower portion of the rear hatch assembly 12 (e.g., near a rear bumper 34 of the vehicle). Referring briefly to FIG. 2A, the tailgate 32 may be formed of multiple panels 35 and 37 that are spaced-apart to define a window receiving volume 39 into which the rear window 28 can retract. In some embodiments, the tailgate 32 may have a coating or covering of a plastic material on an interior surface 33 of the tailgate 32. The tailgate 32 may also include one or more modules such as a seat, table, picnic box, headrest, lighting, an unloading ramp, storage compartment, etc.

Referring back to FIGS. 1 and 2, the hatch frame 38 has a generally horizontal top edge 20, a generally horizontal bottom edge 22 and opposite side edges 24 and 26 that extend generally vertically between the top and bottom edges 20 and 22 defining a somewhat rectangular rear hatch assembly 12. The hatch frame 38 may be other shapes, however, depending on, for example, the shape of the cargo opening 14. As one example, the hatch frame 38 may have one or more rounded edges.

The hatch frame 38 is pivotally connected to the vehicle body 41 at a first substantially horizontal axis $A_1$ at the top edge 20. The hatch frame 18 may be pivotally connected to the vehicle body 41 using any suitable connection that allows the hatch frame 18 to lift from the vehicle body 41. For example, top hinges 45 and 47 along the top edge 20 may be used (FIG. 2). The hatch frame 38 also provides a second horizontal axis $A_2$ between the hatch frame 38 and a bottom edge 40 of the tailgate. The tailgate 32 may be pivotally connected to the hatch frame 38 using any suitable connection such as bottom hinges 53 and 55 along bottom edge 40 of the tailgate 32 (FIG. 2). The rear hatch assembly 12 utilizes the hatch frame 38 to facilitate movement of the entire rear hatch assembly 12 together on the first horizontal axis $A_1$ (FIG. 2) relative to the vehicle body 41 or to allow for movement of the tailgate 32 on the second horizontal axis $A_2$ relative to the hatch frame 38 (FIG. 3). The hatch frame 38 may also allow the rear window 28 to be retracted into the tailgate 32, for example, by providing a track (represented by line 49 of FIG. 1) that is used to guide the rear window 28 between the fully extended and fully retracted positions.

The hatch frame 38 may be formed of any suitable materials such as metals and/or plastics. In some embodiments, the hatch frame 38 may include one or more sealing members disposed about the outer and/or inner periphery of the hatch frame to provide a fluid-tight seal between, e.g., the hatch frame 38 and the vehicle body 41, the hatch frame 38 and the tailgate 32 and the hatch frame 38 and the rear window 28.

Referring to FIG. 3, the rear hatch assembly 12 is illustrated in the second open configuration where the bottom edge 22 of the rear hatch assembly 12 is rotated upward in the direction of arrow 42 to an open position. The hatch frame 38 may support the tailgate 32 and the rear window 28 as shown in this second open configuration. A biasing mechanism 44 (e.g., one or more pneumatic cylinders) may be used to couple the hatch frame 38 to the vehicle 10 and to bias the rear hatch assembly 12 toward the second open configuration. A rear hatch latch mechanism 55 may be utilized to lock the rear hatch assembly 12 in the closed position.

Referring also to FIG. 4, movement of the rear hatch assembly 12 from a closed position to the open position is illustrated. In some embodiments, the second horizontal axis $A_2$ moves vertically with the rear hatch assembly 12 as the rear hatch assembly 12 is rotated toward the open position. In the open position of FIG. 3, for example, the second horizontal axis $A_2$ is located rearward of the first horizontal axis $A_1$ and moves along a generally arcuate path P about the first axis $A_1$ when the rear hatch assembly 12 pivots from the closed to the open position illustrated by FIG. 3.

Opening the entire rear hatch assembly 12 (i.e., the hatch frame 18, the rear window 28 and the tailgate 32) can provide for relatively quick access to the entire cargo opening 14 without any obstruction from the rear hatch assembly 12 as the tailgate 32 is rotated out of the cargo opening 14. The rear hatch assembly 12 in the open position can provide shade or shelter, for example, while loading or unloading the cargo area 16.

Referring to FIG. 5, the rear hatch assembly 12 is illustrated in the third open configuration where an upper edge 46 of the tailgate 32 is rotated downwardly in the direction of arrow 48 relative to the hatch frame 38 to an open position. The rear window 28 may be retracted into the tailgate 32 before the tailgate 32 is rotated. The tailgate 32 may include the internal window receiving volume 39 that houses and protects the rear window 28 with the tailgate in the open position. In some embodiments, the tailgate 32 may have dampening structure for dampening movement and vibration of the rear window 28 as the tailgate 32 is lifted and lowered. Tailgate strikers 50 and 52 may be provided on the hatch frame 38 for use in latching the tailgate 32 to the hatch frame. The tailgate strikers 50 and 52 may interact with a tailgate latch mechanism 53 to lock the tailgate 32 in the closed position. While tailgate strikers 50 and 52 and the tailgate latch mechanism 53 are illustrated, any suitable latching mechanism may be used to lock the tailgate 32 in the closed position. In some embodiments, cables or another holding device may be used to hold the tailgate 32 in a predetermined position when detached from a tailgate latch mechanism 53.

Figure 6:
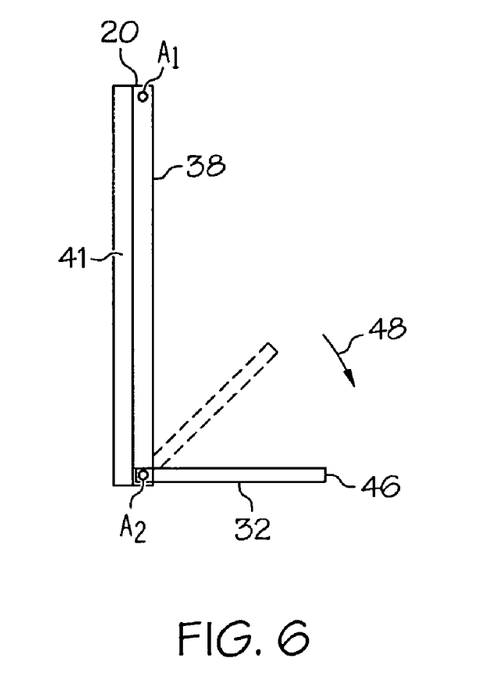
FIG. 6 is a diagrammatic side view of the rear hatch assembly of FIG. 5 in the second open configuration.

Referring also to FIG. 6, movement of the tailgate 32 relative to the hatch frame 38 is illustrated. In this third open configuration, the tailgate 32 moves relative to the hatch frame 38 and the first horizontal axis $A_1$ remains at the top edge 20 while the tailgate 32 rotates.

Figure 7:
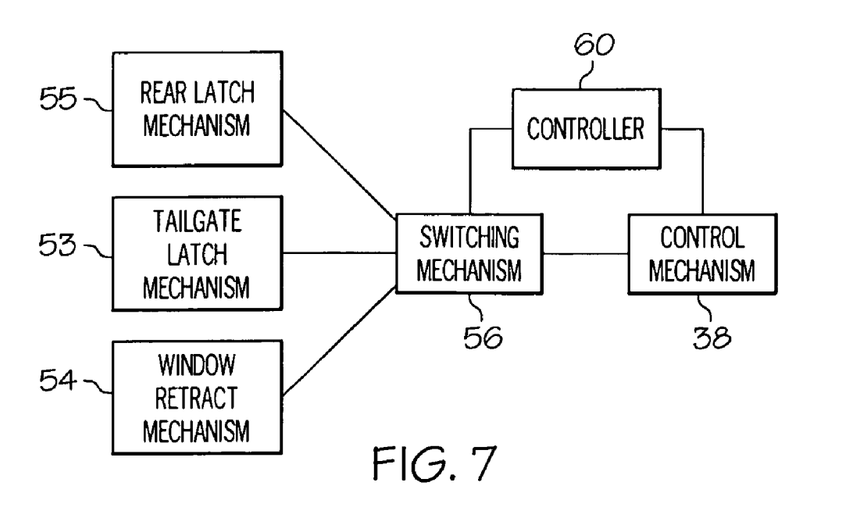
FIG. 7 illustrates an embodiment of a control system for controlling operation of the rear hatch assembly of FIG. 1.

A control mechanism 38 (e.g., one or more handles, knobs, buttons, key mechanisms, etc.) may be provided on the rear hatch assembly 12 to allow operator control of the rear hatch assembly (FIG. 1). Referring to FIG. 7, the control mechanism 38 may be operatively connected to the rear hatch latch mechanism 55, the tailgate latch mechanism 53 and a window retract mechanism 54. A switching mechanism 56 (e.g., a knob, key, etc.) may be provided so that the operator can select between the rear hatch latch mechanism 55, the tailgate latch mechanism 53 and the rear window retract mechanism 54. As one example, the operator may select the rear hatch latch mechanism 55 using the switching mechanism 56. In this example, actuation of the control mechanism 38 unlatches the rear hatch latch mechanism 55, which allows for opening of the entire rear hatch assembly 12 as shown in FIG. 3. As another example, the operator may select the rear window retract mechanism 54 using the switching mechanism 56. In this example, actuation of the control mechanism 38 causes the rear window 28 to either retract into the tailgate 32 as shown in FIG. 1 or extend out of the tailgate 32. As yet another example, the operator may select the tailgate latch mechanism 53 using the switching mechanism 56. In this example, actuation of the control mechanism 38 unlatches the tailgate latch mechanism 53, which allows for opening of the tailgate 32 as shown in FIG. 5.

In some embodiments, a controller 60 may be provided that controls operation of the rear hatch latch mechanism 55, the tailgate latch mechanism 53 and the rear window retract mechanism 54. The controller 60 may be provided with rules for opening and/or closing one or more of the rear hatch latch mechanism 53, the tailgate latch mechanism 55 and the rear window retract mechanism 54. For example, the controller 60 may be provided with logic such that the tailgate latch mechanism 53 may not be unlatched until the rear window 28 is retracted into the tailgate 32. In other words, should the operator attempt to open the tailgate 32 without opening the rear window 28 first, the controller 60 will first open the rear window 28 and then unlatch the tailgate latch mechanism 53. Similarly, the controller 60 may be provided with logic such that the rear hatch mechanism 55 may not be unlatched until the rear window 28 is in the closed position. In other words, should the operator attempt to open the rear hatch assembly 12 with the rear window 28 open, the controller will first close the rear window 28 and then unlatch the rear hatch latch mechanism 55.

Figure 8:
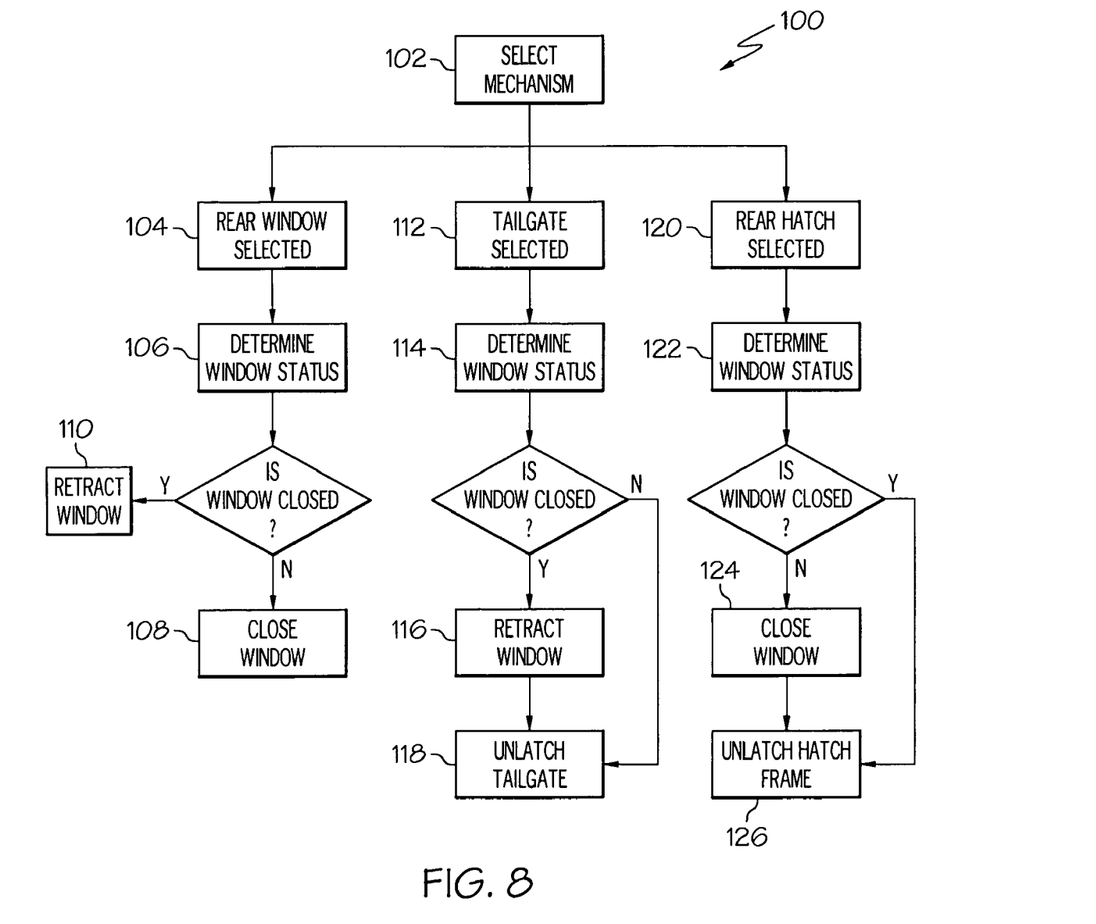
FIG. 8 is an embodiment of a process for operating the rear hatch assembly of FIG. 1.

Referring now to FIG. 8, an exemplary process 100 for operating the rear hatch assembly 12 is shown. At step 102, the operator selects which of the rear hatch latch mechanism 55, the tailgate latch mechanism 53 and the rear window retract mechanism 54 using the switching mechanism 56. At step 104, the operator selects the rear window retract mechanism 54. The controller 60 then determines whether the rear window 28 is in an open position or a closed position at step 106. If the rear window 28 is in an open position, the controller 60 may instruct the rear window retract mechanism 54 to close the rear window 28 at step 108. If the rear window 28 is in a closed position, the controller 60 may instruct the rear window retract mechanism 54 to open the rear window 28 at step 110. Controls may be provided to the operator to select an amount the rear window 28 is to be opened or closed.

At step 112, the operator selects the tailgate latch mechanism 53. The controller 60 then determines if the rear window 28 is fully retracted into the tailgate 32 at step 114. A detector such as a position sensor may be used in determining the position of the rear window 28. If the rear window 28 is not fully retracted into the tailgate 32, the controller 60 may instruct the rear window retract mechanism 54 to retract the rear window 28 at step 116. If the rear window 28 is fully retracted into the tailgate 32, the controller may instruct the tailgate latch mechanism 53 to unlatch the tailgate 32 from the hatch frame 38 at step 118.

At step 120, the operator selects the rear hatch latch mechanism 55. The controller 60 then determines if the rear window 28 is fully closed at step 122. If the rear window 28 is not fully closed, the controller 60 may instruct the rear window retract mechanism 54 to close the rear window 28 at step 124. If the rear window 28 is fully closed, the controller may instruct the rear hatch latch mechanism 55 to unlatch the hatch frame 38 from the vehicle body 41 at step 126.

Figure 9:
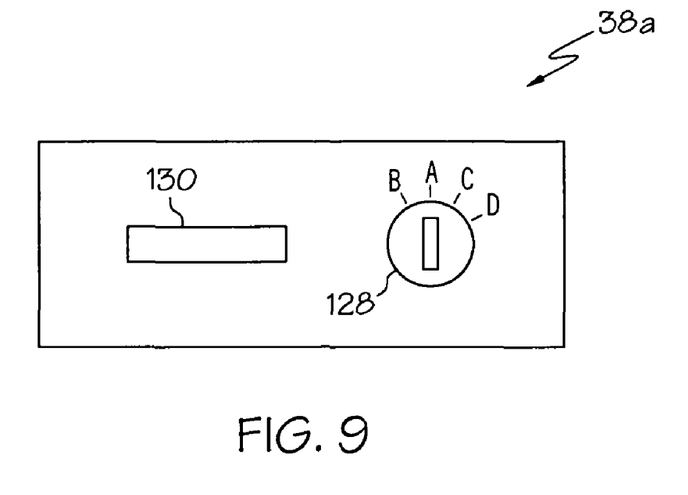
FIG. 9 illustrates an embodiment of a control system for controlling the rear hatch assembly of FIG. 1.

Referring to FIG. 9, a first exemplary control mechanism 38a may, for example, be located on the tailgate 32. The switching mechanism 56, in this embodiment, may include a keyway mechanism 128 that receives a vehicle key. The vehicle key may be used to turn the keyway mechanism 128, for example, between multiple positions A-D between locked, window, tailgate and hatch positions for either locking the rear hatch assembly 12 or allowing control of the rear hatch latch mechanism 55, tailgate latch mechanism 53 and window retract mechanism 54. Other switching mechanisms such as knobs or buttons may be used. A button 130 or other control structure such as a handle or switch may be provided for activating the rear hatch latch mechanism 55, tailgate latch mechanism 53 and window retract mechanism 54.

Figure 10:
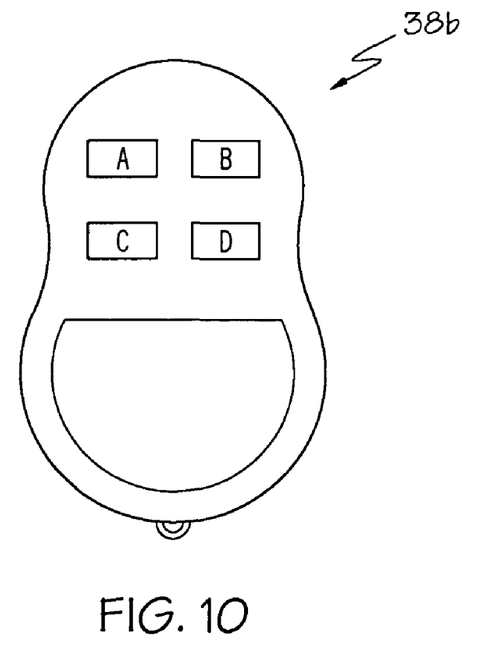
FIG. 10 illustrates another embodiment of a control system for controlling the rear hatch assembly of FIG. 1.

Referring to FIG. 10, another exemplary control mechanism 38b may be a remote control, for example, that operates by broadcasting radio waves on a particular frequency. In this exemplary embodiment, the control mechanism 38b may include buttons A-D for activating the rear hatch latch mechanism 55, tailgate latch mechanism 53 and window retract mechanism 54. In some embodiments, the switching mechanism 56 may not be used. Additionally, there may be a control mechanism located within the vehicle 10 where the operator can control the rear hatch latch mechanism 55, tailgate latch mechanism 53 and window retract mechanism 54. The vehicle 10 may include a receiver that receives remote control signals and sends the control signals, for example, to controller 60.

The above-described rear hatch assembly 12 can provide improved access to the cargo area 16 by incorporating the tailgate 32 into the rear latch assembly. The openable tailgate 32 provides an additional option for the operator to gain access to the cargo area 16. The tailgate 32 allows the operator to bypass opening the entire rear latch assembly 12, for example, when loading or unloading smaller cargo or when overhead clearance is minimal. In other instances, it may be desirable to open the entire latch assembly 12, for example, when loading or unloading larger cargo. The rear hatch assembly 12 may be openable manually or, in some embodiments, the rear hatch assembly 12 may be openable automatically (i.e., power-operated) between the various open and closed configurations, for example, using one or more actuators.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A rear hatch assembly of a vehicle, the rear hatch assembly comprising:
   a hatch frame pivotally connected to a vehicle body at a first pivot axis such that the hatch frame is capable of movement relative to the vehicle body about the first pivot axis;
   a tailgate pivotally connected to the hatch frame at a second pivot axis such that the tailgate is capable of movement relative to the hatch frame about the second pivot axis;
   a rear window carried by the hatch frame; and
   a controller that (i) determines whether the rear window is in a raised or lowered position based on an input from a position sensor and (ii) controls movement of the tailgate based on whether the rear window is in the raised or lowered position as determined using the position sensor.

2. The rear hatch assembly of claim 1, wherein the second pivot axis moves about the first pivot axis as the hatch frame moves about the first pivot axis.

3. The rear hatch assembly of claim 1, wherein the rear window is retractable into the tailgate.

4. The rear hatch assembly of claim 3, wherein the rear window moves about the second pivot axis when retracted into the tailgate.

5. The rear hatch assembly of claim 1, wherein the rear window is carried by the hatch frame as the hatch frame moves about the first pivot axis.

6. The rear hatch assembly of claim 1, wherein tailgate engages latching structure carried by the hatch frame to inhibit movement of the tailgate relative to the hatch frame as the hatch frame moves about the first pivot axis.

7. The rear hatch assembly of claim 1, wherein the first pivot axis and the second pivot axis are substantially parallel.

8. A hatch assembly for a vehicle, comprising:
   a hatch frame;
   a tailgate carried by the hatch frame, the tailgate being moveable relative to the hatch frame;
   a rear window configured to retract into the tailgate;
   a position sensor that determines a position of the rear window;
   a tailgate latch mechanism configured to prevent movement of the tailgate relative to the hatch frame;

a window retract mechanism configured to move the rear window between raised and lowered positions; and a controller that (i) determines whether the rear window is in the raised position using the position sensor and (ii) instructs the window retract mechanism to retract the rear window before instructing the tailgate latch mechanism to unlatch if the controller determines the rear window is in the raised position.

9. The hatch assembly of claim 8, wherein the hatch frame is pivotally connected to a vehicle body at a first pivot axis such that the hatch frame is capable of movement relative to the vehicle body about the first pivot axis.

10. The hatch assembly of claim 9, wherein the tailgate is pivotally connected to the hatch frame at a second pivot axis such that the tailgate is capable of movement relative to the hatch frame about the second pivot axis.

11. The hatch assembly of claim 10, wherein the second pivot axis moves about the first pivot axis as the hatch frame moves about the first pivot axis.

12. The hatch assembly of claim 11, wherein the rear window moves about the second pivot axis when retracted into the tailgate.

13. A vehicle, comprising:
a vehicle body;
a hatch frame connected to the vehicle body, the hatch frame being moveable relative to the vehicle body;
a tailgate carried by the hatch frame, the tailgate being moveable relative to the hatch frame;
a rear window connected to the hatch frame, the rear window being moveable relative to the vehicle body and the hatch frame;
a position sensor that provides an input based on position of the rear window; and
a controller that receives the input from the position sensor, wherein the controller determines whether the rear window is in a raised or lowered position based on the input from the position sensor and allows movement of the tailgate if the rear window is in the lowered position.

14. The vehicle of claim 13, wherein the hatch frame is connected to the vehicle body such that the hatch frame is rotatable upward to an open position.

15. The vehicle of claim 14, wherein the tailgate carried by the hatch frame as the hatch frame rotates to the open position, the tailgate being moveable relative to the hatch frame between a tailgate open position and a tailgate closed position.

16. The vehicle of claim 15, wherein the tailgate is pivotally connected to the hatch frame.

17. The vehicle of claim 15, wherein the rear window is retractable into the tailgate.

18. The vehicle of claim 15, wherein the tailgate engages latching structure carried by the hatch frame to inhibit movement of the tailgate relative to the hatch frame as the hatch frame rotates to the open position.

19. The vehicle of claim 15 further comprising:
a rear hatch latch mechanism configured to prevent movement of the hatch frame;
a tailgate latch mechanism configured to prevent movement of the tailgate, the tailgate latch mechanism being controlled by the controller; and
a window retract mechanism configured to move the rear window.

20. The vehicle of claim 19, wherein, if the controller determines that the rear window is in the raised position using the position sensor, the controller instructs the window retract mechanism to retract the rear window before instructing the tailgate latch mechanism to unlatch.

* * * * *